US008127742B2

(12) United States Patent
Nogawa

(10) Patent No.: US 8,127,742 B2
(45) Date of Patent: Mar. 6, 2012

(54) INTAKE CONTROL DEVICE FOR INTERNAL COMBUSTION ENGINE

(75) Inventor: Shinichiro Nogawa, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 926 days.

(21) Appl. No.: 12/086,974

(22) PCT Filed: May 4, 2007

(86) PCT No.: PCT/IB2007/001156

§ 371 (c)(1), (2), (4) Date: Jun. 23, 2008

(87) PCT Pub. No.: WO2007/132311

PCT Pub. Date: Nov. 22, 2007

(65) Prior Publication Data

US 2009/0272355 A1 Nov. 5, 2009

(30) Foreign Application Priority Data

May 9, 2006 (JP) ................................ 2006-129978

(51) Int. Cl.
*F02B 31/00* (2006.01)
*F02M 35/10* (2006.01)

(52) U.S. Cl. .............. 123/306; 123/184.53; 123/184.55; 123/184.56

(58) Field of Classification Search .................. 123/306, 123/184.55, 184.53, 184.56
See application file for complete search history.

(56) References Cited

U.S. PATENT DOCUMENTS 5,551,392 A * 9/1996 Yamaji et al. ................ 123/306
5,551,394 A * 9/1996 Yoshikawa .................... 123/308
5,823,160 A * 10/1998 Oda et al. ...................... 123/295
5,852,994 A * 12/1998 Tsuzuku et al. .............. 123/308
5,887,568 A * 3/1999 Takeyama et al. ............ 123/306
(Continued)

FOREIGN PATENT DOCUMENTS

CN 2259494 Y 8/1997
(Continued)

OTHER PUBLICATIONS

Chinese Office Action issued in Chinese Application No. 200780006256.1; Issued Dec. 18, 2009 (With Translation).

*Primary Examiner* — Noah Kamen
*Assistant Examiner* — Grant Moubry
(74) *Attorney, Agent, or Firm* — Oliff & Berridge, PLC

(57) ABSTRACT

An intake control device for an internal combustion engine having a first intake passage (5); a second intake passage (8); an intake passage length-changing valve (11); a partition (14) that partitions the intake passage into two partitioned intake passages (12, 13); and a tumble control valve (17). When one of the partitioned intake passages (12) is closed by the tumble control valve (17), air drawn into a combustion chamber through the open partitioned intake passage (13) forms a tumble flow. The length of the second intake passage (8) is longer than the length of the first intake passage (5) from a surge tank (1) to the connection point (S) between the second intake passage (8) and the first intake passage (5), and the passage cross-sectional area of the second intake passage (8) is smaller than the passage cross-sectional area of the first intake passage (5) from the surge tank to the connection point (S).

9 Claims, 14 Drawing Sheets

U.S. PATENT DOCUMENTS

| | | | | | |
|---|---|---|---|---|---|
| 5,937,821 | A * | 8/1999 | Oda et al. | 123/295 |
| 6,148,794 | A * | 11/2000 | Tsuzuku et al. | 123/406.5 |
| 6,598,585 | B2 * | 7/2003 | Schweinzer et al. | 123/306 |
| 6,874,465 | B2 * | 4/2005 | Arimatsu et al. | 123/306 |
| 6,877,478 | B2 * | 4/2005 | Kim et al. | 123/306 |
| 6,904,891 | B2 * | 6/2005 | Tominaga et al. | 123/302 |
| 7,128,050 | B1 * | 10/2006 | Abe | 123/306 |
| 7,156,071 | B2 * | 1/2007 | Abe et al. | 123/306 |
| 2001/0022169 | A1 | 9/2001 | Tokuyasu et al. | |
| 2004/0045533 | A1 * | 3/2004 | Sukegawa et al. | 123/478 |
| 2004/0107934 | A1 | 6/2004 | Bucknell et al. | |

FOREIGN PATENT DOCUMENTS

| | | | |
|---|---|---|---|
| CN | 1184885 | A | 6/1998 |
| DE | 37 04 717 | A1 | 8/1987 |
| DE | 199 54 455 | A1 | 5/2001 |
| JP | A-07-197816 | | 8/1995 |
| JP | A-07-197823 | | 8/1995 |
| JP | A-2002-070566 | | 3/2002 |
| JP | A-2004-293485 | | 10/2004 |

* cited by examiner

F I G . 4
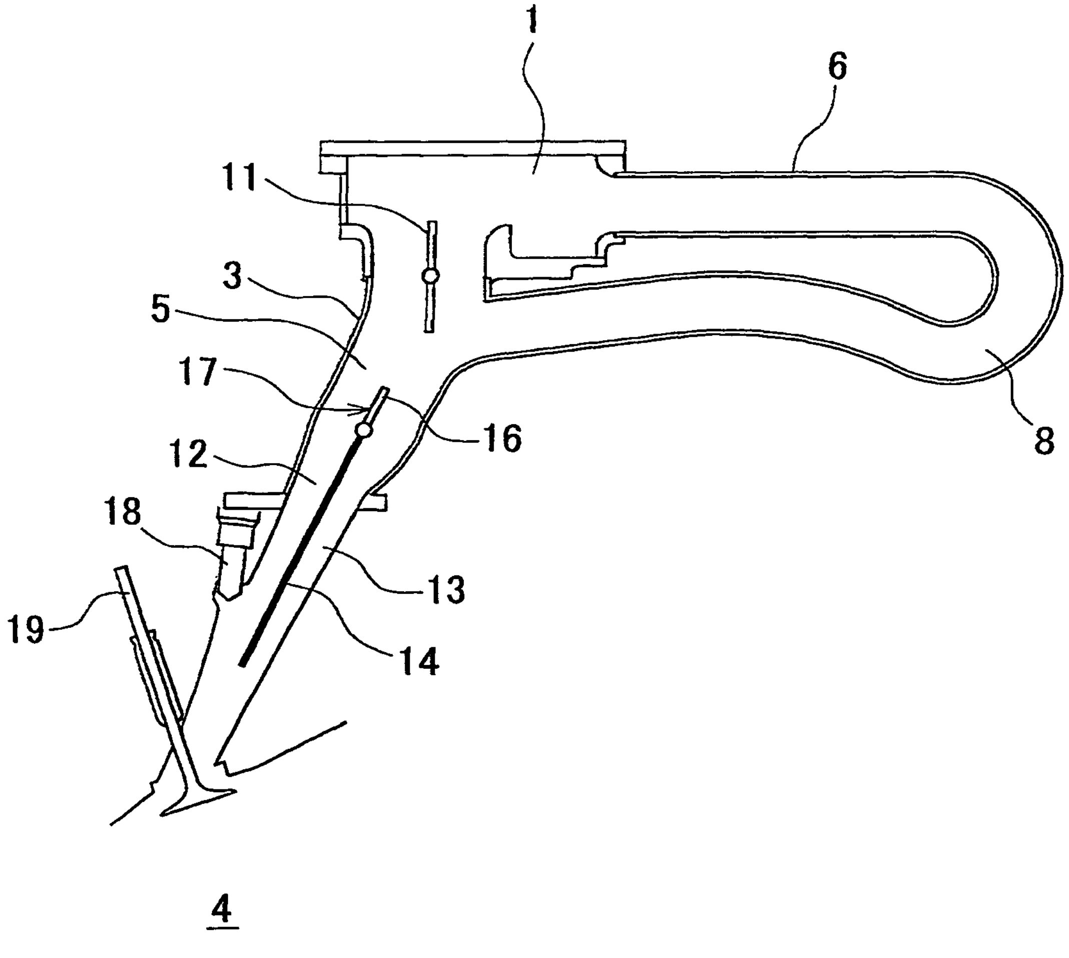

F I G . 12
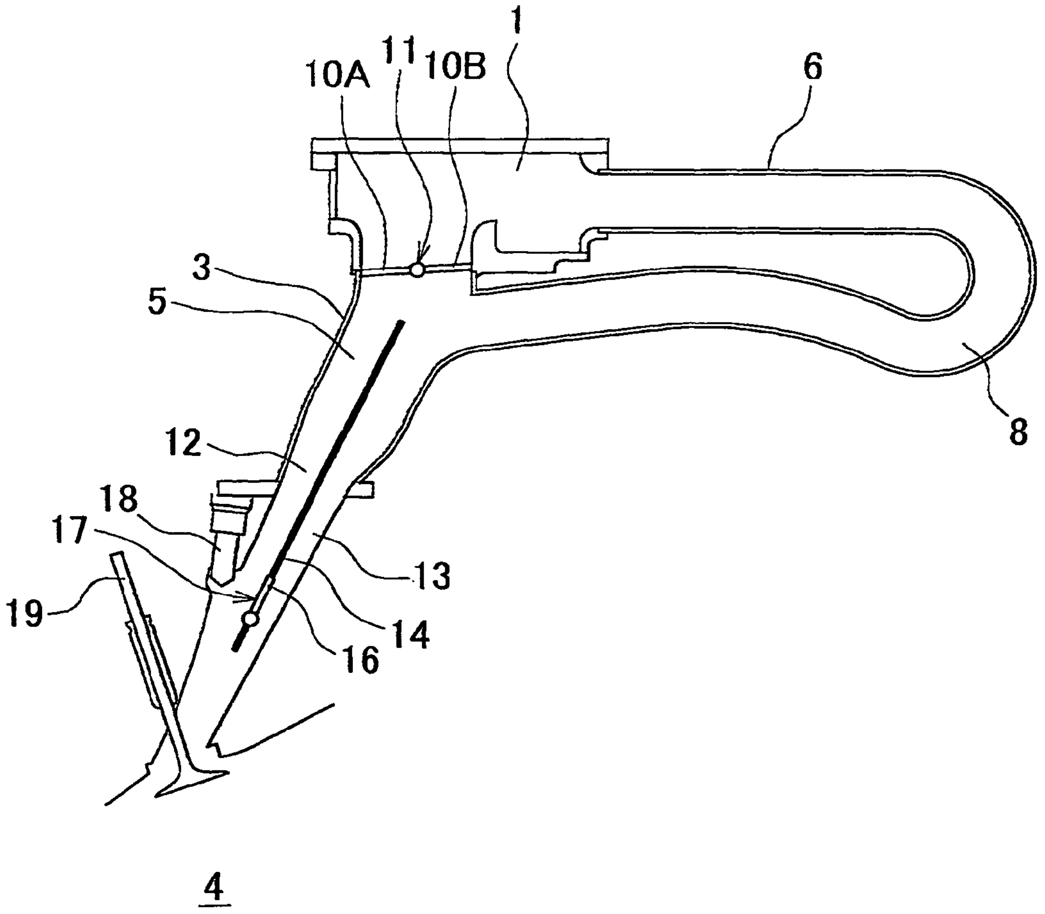

INTAKE CONTROL DEVICE FOR INTERNAL COMBUSTION ENGINE

BACKGROUND OF THE INVENTION

1. Field of the Invention

The present invention relates to an intake control device for an internal combustion engine.

2. Description of the Related Art

It is known that the amount of air to be drawn into the combustion chamber of an internal combustion engine may be increased using an inertia charging effect. Japanese Patent Application Publication No. 7-197823 (JP-A-7-197823) describes an intake control device for an internal combustion engine having two intake passages with different lengths from a surge tank to a combustion chamber and a passage length switching valve for switching the length of the intake passage from the surge tank to the combustion chamber depending on the operating condition of the internal combustion engine so that an inertia charging effect may be used to increase the amount of air to be drawn into the combustion chamber.

It is also known that the combustion is improved when the air drawn into the combustion chamber forms a tumble flow in the combustion chamber. The intake control device for an internal combustion engine described in JP-A-7-197823 has a tumble switching valve for forming a tumble flow of air in the combustion chamber in the intake passage upstream of the combustion chamber. When closed, the tumble switching valve partially closes the intake passage so that air can flow downstream along only one side of the tumble switching valve, that is, air flows downstream through only a portion of the intake passage to form a tumble flow of air into the combustion chamber.

The intake passage is partially closed by the tumble switching valve to form a tumble flow of air in the combustion chamber in the intake control device for an internal combustion engine described in JP-A-7-197823, whereas there is also an intake device, as described in, for example, Japanese Patent Application Publication No. 2002-70566 (JP-A-2002-70566), in which an intake passage is partitioned into two passages and one of the passages may be closed by a tumble control valve at the upstream end of the partition so that air flows into the combustion chamber only through the other path to form a tumble flow of air in the combustion chamber.

Also in the intake device described in JP-A-2002-70566, two intake passages with different lengths to the combustion chamber are formed and the length of the intake passage to the combustion chamber is switched with a variable intake length valve depending on the operating condition of the internal combustion engine so that an inertia charging effect can be used to increase the amount of air to be drawn into the combustion chamber as much as possible.

However, if a configuration in which an intake passage is divided into two passages by a partition and one of the passages may be closed by a tumble control valve at the upstream end of the partition to form a tumble flow of air in the combustion chamber is adopted, as in the intake device described in JP-A-2002-70566, even when the length of the intake passage to the combustion chamber is switched with the variable intake length valve in order to achieve an inertia charging effect, a sufficient inertia charging effect may not be achieved depending on the operating condition of the tumble control valve because the volume of the intake passage to the combustion chamber changes largely.

SUMMARY OF THE INVENTION

The present invention provides an intake control device for an internal combustion engine in which the length of the intake passage to the combustion chamber may be changed and in which an internal space in the intake pipe is partitioned into two intake passages by a partition to form a tumble flow of air in the combustion chamber.

A first aspect of the present invention is an intake control device for an internal combustion engine including: a surge tank; a first intake passage that extends from the surge tank and is connected to a combustion chamber, a second intake passage that extends from the surge tank and is connected to the first intake passage; an intake passage length-changing valve provided upstream of a connection point where the second intake passage connects to the first intake passage, that opens and closes the first intake passage; a partition disposed in the first intake passage that partitions an internal space in the first intake passage downstream of the connection point along an axis of the first intake passage to form two partitioned intake passages; a tumble control valve that opens and closes one of the partitioned intake passages, wherein when the tumble control valve closes one of the partitioned intake passages air drawn into the combustion chamber through the open partitioned intake passage forms a tumble flow, the intake control device characterized in that: the length of the second intake passage from the surge tank to the first intake passage is longer than the length of the first intake passage from the surge tank to the connection point; and the cross-sectional area of the second intake passage is smaller than the cross-sectional area of the first intake passage from the surge tank to the connection point.

In the second aspect of the present invention, the connection point is closer to the surge tank than to the combustion chamber, in the first aspect.

In the third aspect of the present invention, the connection point is adjacent to the surge tank, in the second aspect.

In the fourth aspect of the present invention, the second intake passage is connected to the first intake passage from a direction generally perpendicular to the partition, and the tumble control valve opens and closes the partitioned intake passages formed on the side opposite the side on which the second intake passage is connected to the first intake passage with respect to the partition, in the first to third aspects.

In the fifth aspect of the present invention, the tumble control valve is attached to the partition and is rotatable about a pivot shaft that is attached to the partition, in the first to fourth aspects.

In the sixth aspect of the present invention, the tumble control valve has a plate-shaped valve element that is rotatable about the pivot shaft, and the plate-shaped valve element of the tumble control valve is parallel to the partition when the tumble control valve has opened the one of the partitioned intake passages, in the fifth aspect In the seventh aspect of the present invention, the pivot shaft of the tumble control valve is attached to the partition at an end of tie partition that is near the combustion chamber, and the plate-shaped valve element of the tumble control valve is in or near the same plane as the partition when the tumble control valve has opened the partitioned intake passage, in the fifth or sixth aspect.

In the eighth aspect of the present invention, the intake passage length-changing valve has a plate-shaped valve element, and the plate-shaped valve element of the intake passage length-changing valve is in or near the same plane as the partition when the intake passage length-changing valve has opened the first intake passage, in any one of the first to seventh aspects.

In the ninth aspect of the present invention, a periphery on the combustion side of the plate-shaped valve element of the intake passage length-changing valve is adjacent to the surge tank side end of the partition when the intake passage length-changing valve has opened the first intake passage, in the eighth aspect.

In the tenth aspect of the present invention, the intake passage length-changing valve has two plate-shaped valve elements independently ratatable through different ranges about two adjacent pivot shafts or one common pivot shaft, and a periphery of one of the plate-shaped valve elements of the intake passage length-changing valve is adjacent to the surge tank side end of the partition and a periphery of the other plate-shaped valve element of the intake passage length-changing valve is adjacent to an end face on the surge tank side of the second intake passage connected to the first intake passage when the intake passage length-changing valve has closed the first intake passage, in the ninth aspect.

In the eleventh aspect of the present invention, the length and passage cross-sectional area of the first intake passage and the length and passage cross-sectional area of the second intake passage are set such that air is drawn into the combustion chamber through the first intake passage with the aid of an inertia charging effect when the engine speed is higher than a predetermined engine speed and that air is drawn into the combustion chamber through the second intake passage with the aid of an inertia charging effect when the engine speed is lower than a predetermined engine speed, in any one of the first to tenth aspects.

In the twelfth aspect of the present invention, the intake passage length-changing valve keeps the first intake passage open and the tumble control valve keeps the partitioned intake passage open when the engine load is lower than a predetermined engine load in an engine load range that the internal combustion engine is operating at lower load than full load or close to full load and the internal combustion engine is performing stoichiometric combustion in which the air fuel mixture in the combustion chamber is burned at an air-fuel ratio equal to or close to theoretical air fuel ratio, the intake passage length-changing valve keeps the first intake passage open and the tumble control valve keeps one of the partitioned intake passages closed when the engine load is higher than a predetermined engine load in an engine load range that the internal combustion engine is operating at lower load than full load or close to full load and the internal combustion engine is performing lean-burn combustion in which the air fuel mixture in the combustion chamber is burned at an air-fuel ratio greater than theoretical air-fuel ratio, the operation of the intake passage length-changing valve and the operation of the tumble control valve are controlled depending on the engine speed when the engine load is equal to or close to full load, in any one of the first to eleventh aspects.

In the thirteenth aspect of the present invention, in the case where the operating condition of the internal combustion engine is divided into a low speed operating condition, a low-intermediate speed operating condition, an intermediate-high speed operating condition, and a high speed operating condition in order of increasing engine speed, the intake passage length-changing valve keeps the first intake passage closed and the tumble control valve keeps one of the partitioned intake passages closed when the engine load is equal to or close to full load and the internal combustion engine is in the low speed operating condition, the intake passage length-changing valve keeps the first intake passage closed and the tumble control valve keeps the partitioned intake passage open when the engine load is equal to or close to full load and the internal combustion engine is in the a low-intermediate speed operating condition, the intake passage length-changing valve keeps the first intake passage open and the tumble control valve keeps one of the partitioned intake passages closed when the engine load is equal to or close to full load and the internal combustion engine is in the intermediate-high speed operating condition, and the intake passage length-changing valve keeps the first intake passage open and the tumble control valve keeps the partitioned intake passage open when the engine load is equal to or close to full load and the internal combustion engine is in the high speed operating condition, in the first to twelfth aspects.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 4 is a view illustrating, as in the case with FIG. 1, the intake control device for an internal combustion engine according to the first embodiment of the present invention, in which the intake passage length-changing valve has opened the main intake passage and the tumble control valve has opened the partitioned intake passages;

FIG. 12 is a view illustrating, as in the case with FIG. 11, the intake control device for an internal combustion engine according to the third embodiment of the present invention, in which the intake passage length-changing valve has closed the main intake passage and the tumble control valve has opened the partitioned intake passages;

DETAILED DESCRIPTION OF THE INVENTION

Figure 1:
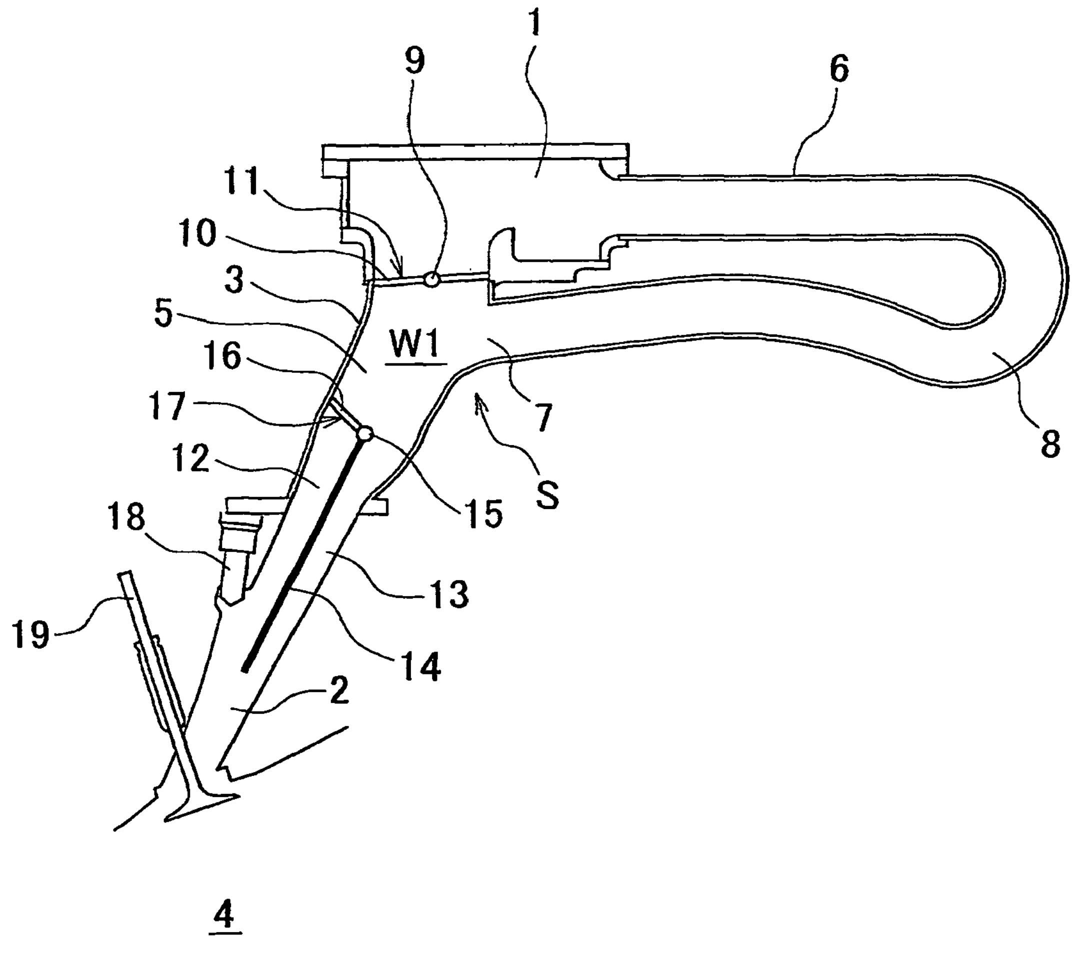
FIG. 1 is a view illustrating an intake control device for an internal combustion engine according to a first embodiment of the present invention, in which an intake passage length-changing valve has closed a main intake passage and a tumble control valve has closed one of partitioned intake passages.

Example embodiments of intake control device for an internal combustion engine according to the present invention will now be described. In the following description, the "upper side" in the drawings is referred to as "upper," the "lower side" as "lower," "right side" as "right," "left side" as "left," and the "right and left direction" as "lateral direction."

FIG. 1 to FIG. 4 illustrate a first embodiment of an intake control device for an internal combustion engine according to the present invention. As shown in FIG. 1, the intake control device of the first embodiment has a surge tank 1, and an intake pipe (which is hereinafter referred to as "main intake pipe") 3 extending obliquely leftward and downward from a lower side of the surge tank 1 and connected to an intake port 2. The main intake pipe 3 extends generally straight from the surge tank 1 to the intake port 2 and connected to the intake port 2 such that it is aligned with the intake port 2. The main intake pipe 3 and the intake port 2 together form an intake passage (hereinafter "main intake passage") 5 that extends from the surge tank 1 to a combustion chamber 4.

The intake control device also has an intake pipe (hereinafter "sub-intake pipe") 6 extending from the right side of the surge tank 1 and connected to the main intake pipe 3. The sub-intake pipe 6, which extends generally straight to the right from the surge tank 1 a prescribed length, turns around and extends generally straight to the left, is connected to the main intake pipe 3 at a point 7 which is closer to the surge tank 1 than to the combustion chamber 4 and, in particular, adjacent to the surge tank 1. An intake passage (hereinafter "sub-intake passage") 8 extending from the surge tank 1 to the main intake pipe 3 (that is, the main intake passage 5) is formed by the sub-intake pipe 6.

The length of the sub-intake passage 8 from the surge tank 1 to the main intake passage 5 is longer than that of the main intake passage 5 from the surge tank 1 to a connection point S between the sub-intake passage 8 and the main intake passage 5. The passage cross-sectional area of the sub-intake passage 8 is smaller than that of the main intake passage 5 from the surge tank 1 to the connection point S between the sub-intake passage 8 and the main intake passage 5.

A valve (hereinafter "intake passage length-changing valve") 11 having a plate-shaped valve element 10 rotatable about a pivot shaft 9 to open and close the main intake pipe 3 is disposed upstream of the point S (which is hereinafter referred to as "intake pipe connection point") where the sub-intake pipe 6 is connected to the main intake pipe 3. The intake passage length-changing valve 11 shown in FIG. 1 and FIG. 2 has closed the main intake pipe 3 and the intake passage length-changing valve 11 shown in FIG. 3 and FIG. 4 has opened the main intake pipe 3.

Figure 2:
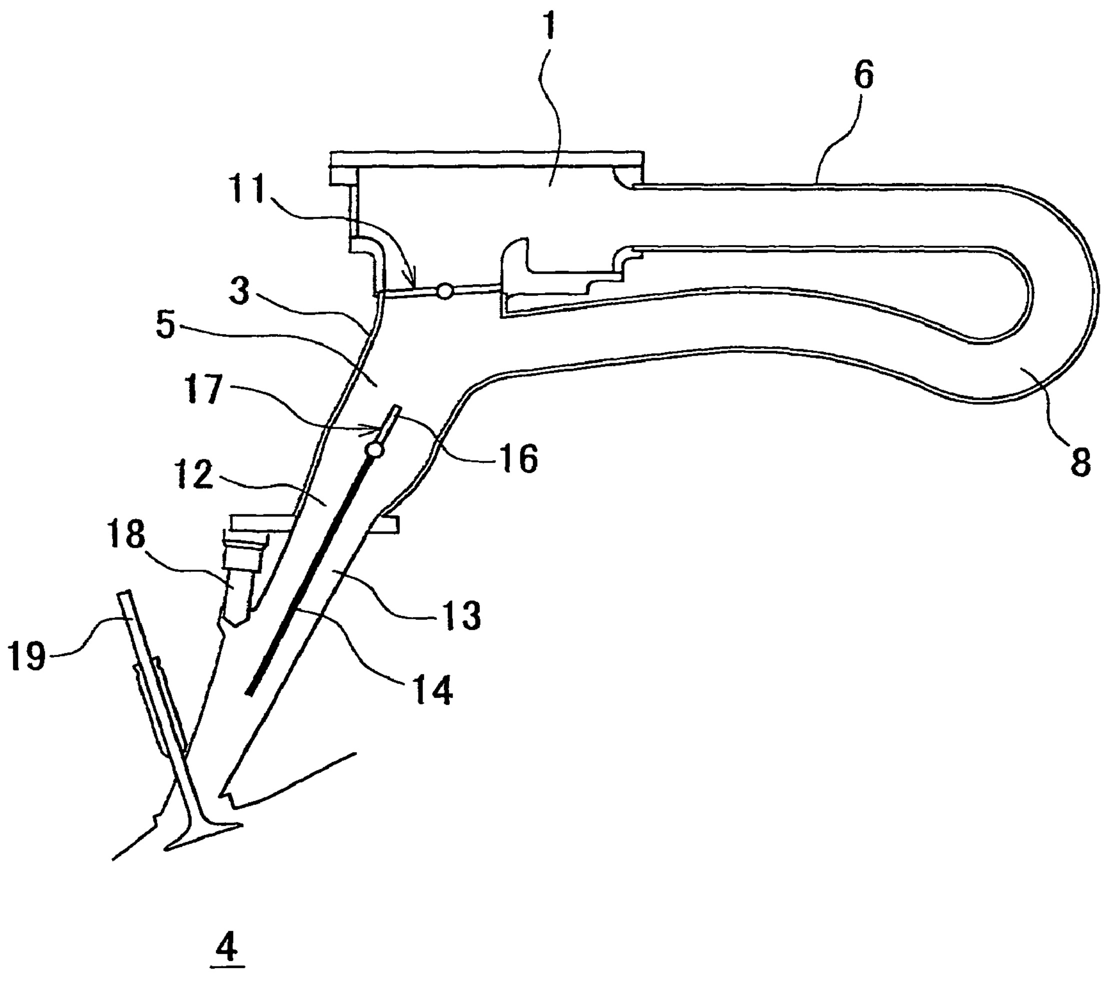
FIG. 2 is a view illustrating, as in the case with FIG. 1, the intake control device for an internal combustion engine according to the first embodiment of the present invention, in which the intake passage length-changing valve has closed the main intake passage and the tumble control valve has opened the partitioned intake passages.

A partition 14 that partitions an internal space in the main intake passage 5 along the axis of the main intake passage 5 into two intake passages 12 and 13 is disposed downstream of the intake pipe connection point S in the main intake passage 5. The partition 14 is a flat plate and disposed such that the width direction of a plane including the plate is perpendicular or generally perpendicular to the central axis of the combustion chamber 4. At the end of the partition 14 near the surge tank 1, a valve (which is hereinafter referred to as "tumble control valve") 17, having a plate-shaped valve element 16 rotatable about a pivot shaft 15 attached to the end of the partition 14 to open and close the partitioned intake passage 12, is disposed. The tumble control valve 17 shown in FIG. 1 and FIG. 3 has closed the partitioned intake passage 12, and the tumble control valve 17 shown in FIG. 2 and FIG. 4 has opened the partitioned intake passage 12. When the tumble control valve 17 has opened the partitioned intake passage 12, the plate-shaped valve element 16 of the tumble control valve 17 is parallel to the partition 14, and, in particular, on the same or generally the same plane as the partition 14 as shown in FIG. 2 and FIG. 4.

The sub-intake pipe 6 is connected to the main intake pipe 3 such that the axis of the sub-intake pipe 6 immediately upstream of the point where it is connected to the main intake pipe 3 is perpendicular or generally perpendicular to the width direction of a plane including the partition 14. Also, the sub-intake pipe 6 is connected to the main intake pipe 3 from a direction perpendicular or generally perpendicular to the partition 14. The partitioned intake passage 12, which is opened and closed by the tumble control valve 17, is the partitioned intake passage on the side opposite the side on which the sub-intake pipe 6 is connected to the main intake pipe 3 with respect to the partition 14. In FIG. 1, a fuel injection valve 18 and an intake valve 19 are also shown.

When the intake passage length-changing valve 11 has closed the main intake passage 5 and the tumble control valve 17 has closed the partitioned intake passage 12 (that is, in the state shown in FIG. 1), air flows from the surge tank 1 through the sub-intake passage 8 into the main intake passage 5, and flows into the combustion chamber 4 only through the partitioned intake passage 13, which is not closed by the tumble control valve 17. When the intake passage length-changing valve 11 has closed the main intake passage 5 and the tumble control valve 17 has opened the partitioned intake passage 12 (that is, in the state shown in FIG. 2), air flows from the surge tank 1 through the sub-intake passage 8 into the main intake passage 5, and flows into the combustion chamber 4 through both the partitioned intake passages 12 and 13.

When the intake passage length-changing valve 11 has opened the main intake passage 5 and the tumble control valve 17 has closed the partitioned intake passage 12 (that is, in the state shown in FIG. 3), air mainly flows from the surge tank 1 directly into the main intake passage 5, and flows into the combustion chamber 4 only through the partitioned intake passage 13, which is not closed by the tumble control valve 17. When the intake passage length-changing valve 11 has opened the main intake passage 5 and the tumble control valve 17 has opened the partitioned intake passage 12 (that is, in the state shown in FIG. 4), air mainly flows from the surge tank 1 directly into the main intake passage 5, and flows into the combustion chamber 4 through both the partitioned intake passages 12 and 13.

Figure 3:
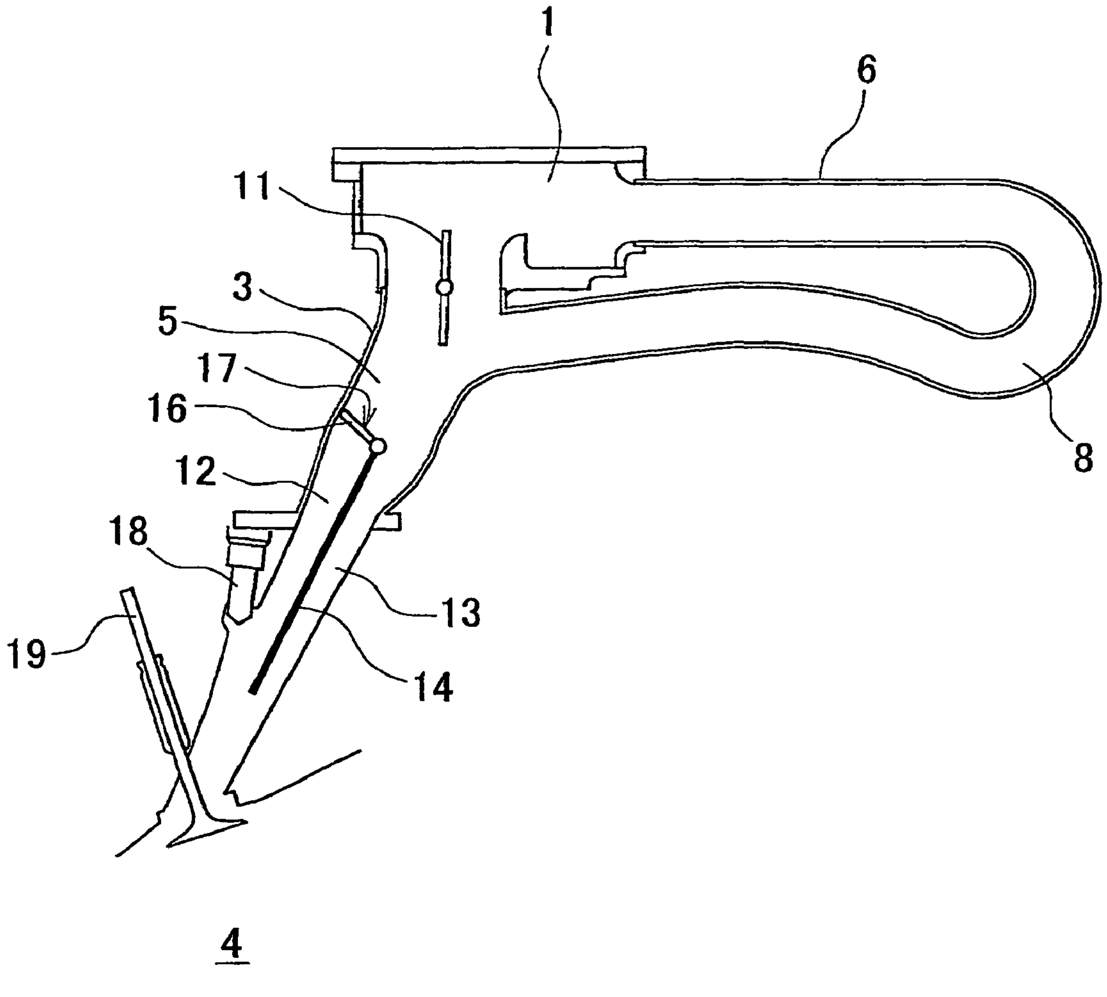
FIG. 3 is a view illustrating, as in the case with FIG. 1, the intake control device for an internal combustion engine according to the first embodiment of the present invention, in which the intake passage length-changing valve has opened the main intake passage and the tumble control valve has closed one of the partitioned intake passages.

Among the shapes of the intake passage through which air flows from the surge tank 1 into the combustion chamber 4 shown in FIG. 1 to FIG. 4, the inertia charging effect, which is achieved at a lower engine speed, is highest when the intake passage length-changing valve 11 and the tumble control valve 17 are in the state shown in FIG. 1, second highest when in the state shown in FIG. 2, third highest when in the state shown in FIG. 3, and lowest when in the state shown in FIG. 4. In other words, the length and passage cross-sectional area of the main intake passage 5 and the length and passage cross-sectional area of the sub-intake passage 8 are set to be the longest and the smallest when the intake passage length-changing valve 11 and the tumble control valve 17 are in the state shown in FIG. 1, second longest and smallest when the intake passage length-changing valve 11 and the tumble control valve 17 are in the state shown in FIG. 2, third longest and smallest when the intake passage length-changing valve 11 and the tumble control valve 17 are in the state shown in FIG. 3, and the shortest and the largest when the intake passage length-changing valve 11 and the tumble control valve 17 are in the state shown in FIG. 4.

As the intake passage, through which air flows, becomes longer and narrower, a higher inertia charging effect may be achieved at a low engine speed. That is, as the length of the intake passage is longer and the cross-sectional area of the intake passage is smaller, synchronous engine speed regarding so-called intake pulsation will be lower. Therefore, when the engine speed is the lowest, the highest inertia charging effect may be achieved by the intake passage length-changing valve 11 and the tumble control valve 17 being controlled to the state shown in FIG. 1, and when the engine speed is the second lowest, the highest inertia charging effect may be achieved by the intake passage length-changing valve 11 and the tumble control valve 17 being controlled to the state shown in FIG. 2. When the engine speed is the third lowest, the highest inertia charging effect may be achieved by the intake passage length-changing valve 11 and the tumble control valve 17 being controlled to the state shown in FIG. 3, and when the engine speed is the highest, the highest inertia charging effect may be achieved by the intake passage length-changing valve 11 and the tumble control valve 17 being controlled to the state shown in FIG. 4.

Figure 5:
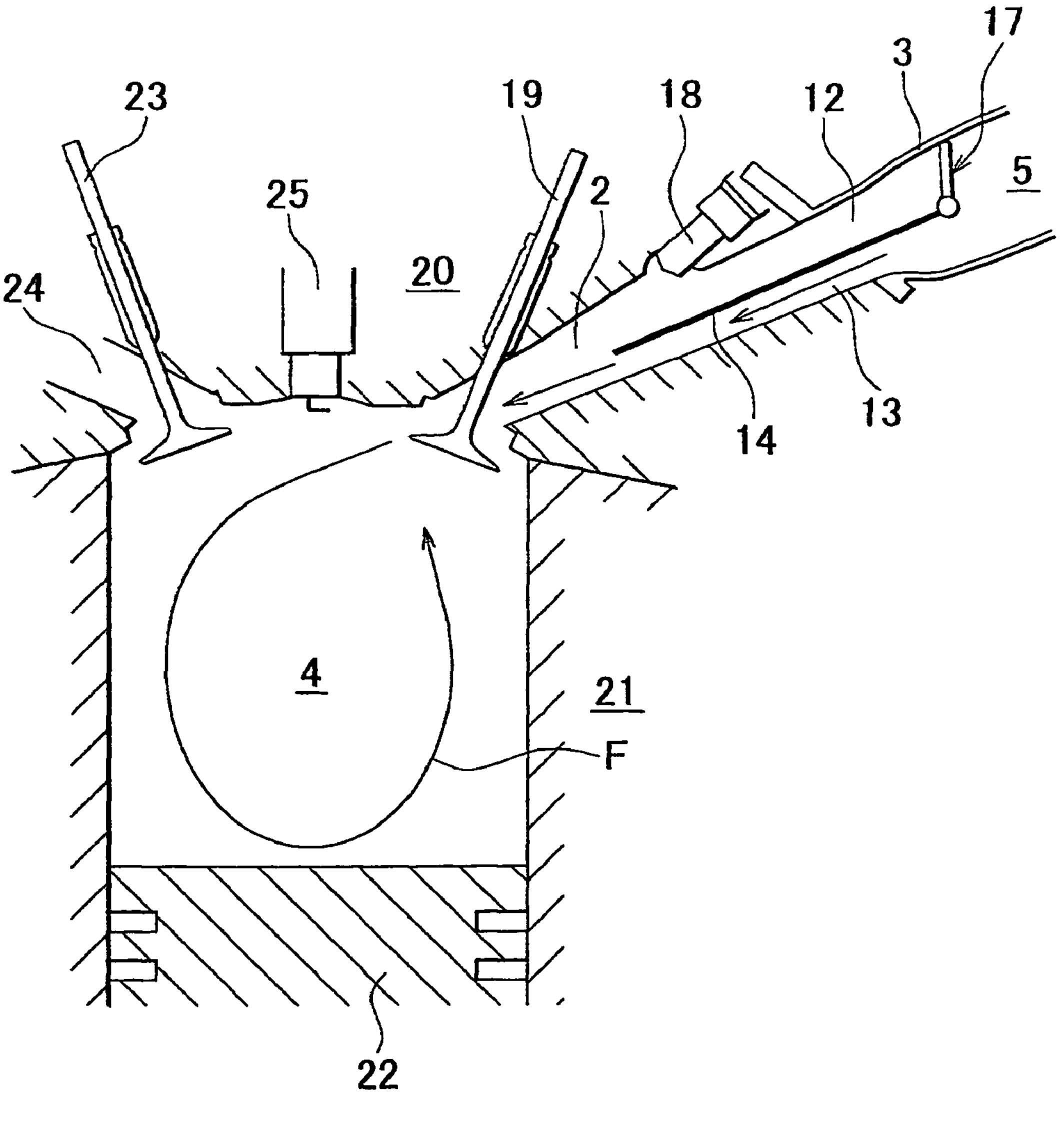
FIG. 5 is a view illustrating a tumble flow of air (air-fuel mixture), which is formed in a combustion chamber.

When the tumble control valve 17 has closed the partitioned intake passage 12 as shown in FIG. 1 and FIG. 3, air flows into the combustion chamber 4 only through the partitioned intake passage which is not closed by the tumble control valve 17, and a tumble flow of air (air-fuel mixture) is formed in the combustion chamber 4 as indicated by a reference symbol F in FIG. 5. In FIG. 5, a cylinder head 20, a cylinder block 21, a piston 22, an exhaust valve 23, an exhaust port 24, spark plug 25 are also shown.

The control of the intake passage length-changing valve 11 and the control of the tumble control valve 17 are next described. The internal combustion engine performs lean-burn combustion, in which the air-fuel mixture in the combustion chamber 4 is burned at an air-fuel ratio higher than the stoichiometric air-fuel ratio (lean air-fuel ratio) when the engine operating condition is in a range X shown in FIG. 6 (that is, the engine load is not equal to or close to full load, the engine speed is relatively low, and the engine load is in a relatively low range), and the internal combustion engine performs a stoichiometric combustion, in which the air-fuel mixture in the combustion chamber 4 is burned at an air-fuel ratio equal to or close to the stoichiometric air-fuel ratio when the engine operating condition is in the range Y shown in FIG. 6 (that is, the engine load is not equal to or close to full load, the engine speed is relatively high, and the engine load is in a relatively high range). When the internal combustion engine is controlled as the above-mentioned, the intake passage length-changing valve 11 and the tumble control valve 17 are controlled as described below.

When the engine operating condition is in the range Y and the internal combustion engine is performing stoichiometric combustion, the intake passage length-changing valve 11 is controlled to keep the main intake passage 5 open and the tumble control valve 17 is controlled to keep the partitioned intake passage 12 open as shown in FIG. 4. That is, when the internal combustion engine performs stoichiometric combustion, the engine load is relatively high and therefore the amount of air to be drawn into the combustion chamber 4 (which is hereinafter referred to as "intake air amount") must be increased to a relatively large level. When the intake passage length-changing valve 11 and the tumble control valve 17 are controlled as described above, pumping loss is reduced and the intake air amount can be relatively large because air flows into the combustion chamber 4 through the entire main intake passage 5.

When the engine operating condition is in the range X and the internal combustion engine is performing lean-burn combustion, the intake passage length-changing valve 11 is controlled to keep the main intake passage 5 open and the tumble control valve 17 is controlled to keep the partitioned intake passage 12 closed as shown in FIG. 3. That is, the internal combustion engine performs lean-burn combustion, the engine load is relatively low and therefore the intake air amount does not have to be increased very much but good combustion must be achieved with a small amount of fuel. When the intake passage length-changing valve 11 and the tumble control valve 17 are controlled as described above, a tumble flow of air (air-fuel mixture) is formed in the combustion chamber 4, as shown in FIG. 5, because air flows into the combustion chamber 4 only through the partitioned intake passage 12. Then, mixing of fuel and air is promoted, and good combustion is achieved with a small amount of fuel.

Figure 6:
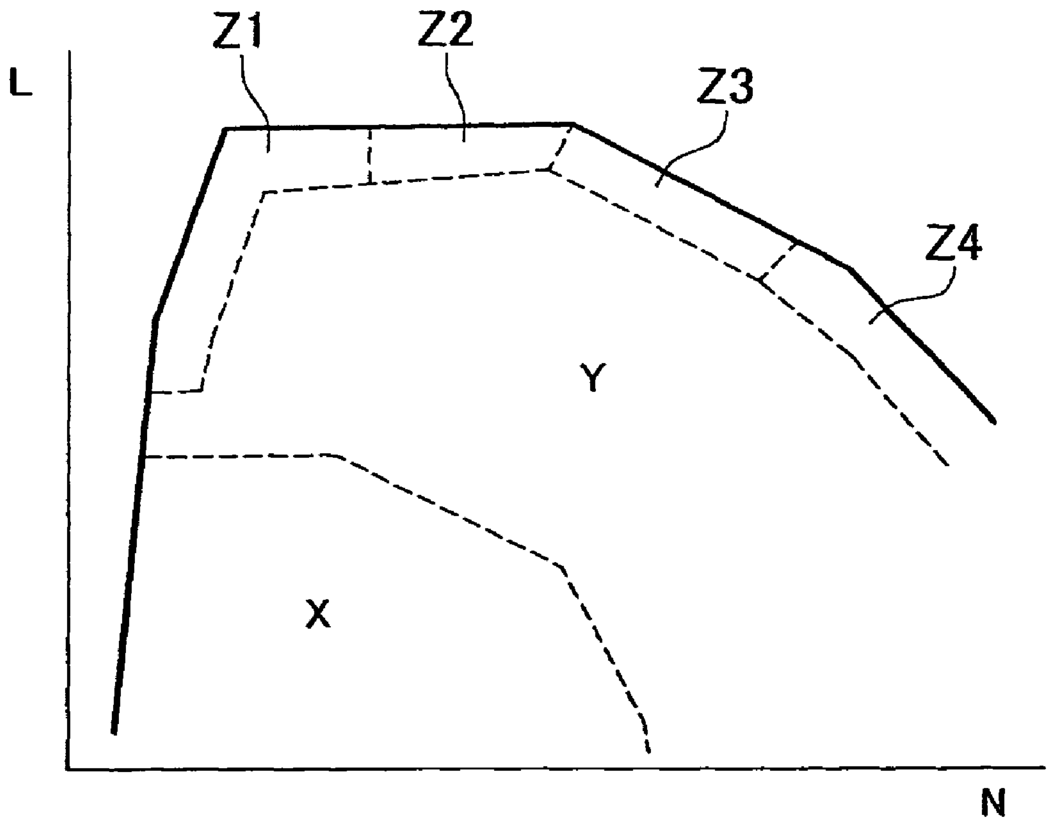
FIG. 6 is a view illustrating an engine operating condition divided into a plurality of ranges depending on the engine speed N and the engine load L.

In the case where the range in which the engine load is equal to or close to full load is divided into a low speed range Z1, a low-intermediate speed range Z2, an intermediate-high speed range Z3, and a high speed range Z4 in the ascending order of engine speed as shown in FIG. 6, when the engine operating condition is in one of the ranges Z1 to Z4 and the internal combustion engine performs full-load combustion, in which the air-fuel mixture in the combustion chamber 4 is burned at an air-fuel ratio equal to or close to the stoichiometric air-fuel ratio or at an air-fuel ratio lower than the stoichiometric air-fuel ratio (rich air-fuel ratio), die intake passage length-changing valve 11 and the tumble control valve 17 are controlled as described below.

When the engine operating condition is in the low speed range Z1 and the internal combustion engine is performing full-load combustion, the intake passage length-changing valve 11 is controlled to keep the main intake passage 5 closed and the tumble control valve 17 is controlled to keep the partitioned intake passage 12 closed as shown FIG. 1. That is, when the internal combustion engine performs full-load combustion, the engine load is very high and therefore the intake air amount must be increased as much as possible. When the engine operating condition is in the low speed range Z1, an inertia charging effect may be achieved and the intake air amount may be vary large by the shape of the intake passage (the shape of the intake passage through which air flows from the surge tank 1 into the combustion chamber 4) being as narrow and long as possible because of the relation with the engine speed. Therefore, when the intake passage length-changing valve 11 and the tumble control valve 17 are controlled as described above, a very large amount of air flows into the combustion chamber 4 by an inertia charging effect because the length and passage cross-sectional area of the main intake passage 5 and the length and passage cross-sectional area of the sub-intake passage 8 are set to be the longest and narrowest.

When the engine operating condition is in the low-intermediate speed range Z2 and the internal combustion engine is performing full-load combustion, the intake passage length-changing valve 11 is controlled to keep the main intake passage 5 closed and the tumble control valve 17 is controlled to keep the partitioned intake passage 12 open as shown in FIG. 2. That is, when the internal combustion engine performs full-load combustion, the engine load is very high and therefore the intake air amount must be increased as much as possible. When the engine operating condition is in the low-intermediate speed range Z2, an inertia charging effect may be achieved and the amount of air may be very large by the shape of the intake passage being the second narrowest and longest because of the relation with the engine speed. Therefore, when the intake passage length-changing valve 11 and the tumble control valve 17 are controlled as described above, a very large amount of air flows into the combustion chamber 4 by an inertia charging effect because the shape of the intake passage is at its second narrowest and longest.

When the engine operating condition is in the intermediate-high speed range Z3 and the internal combustion engine is performing full-load combustion, the intake passage length-changing valve 11 is controlled to keep the main intake passage 5 open and the tumble control valve 17 is controlled to keep the partitioned intake passage 12 closed as shown in FIG. 3. That is, when the internal combustion engine performs full-load combustion, the engine load is very high and therefore the intake air amount must be increased as much as possible. When the engine operating condition is in the intermediate-high speed range Z3, an inertia charging effect may be achieved and the amount of air may be very large by the shape of the intake passage being the third narrowest and longest because of the relation with the engine speed. Therefore, when the intake passage length-changing valve 11 and the tumble control valve 17 are controlled as described above, a very large amount of air flows into the combustion chamber 4 by an inertia charging effect because the shape of the intake passage is at its third narrowest and longest.

When the engine operating condition is in the high speed range Z4 and the internal combustion engine is performing full-load combustion, the intake passage length-changing valve 11 is controlled to keep the main intake passage 5 open and the tumble control valve 17 is controlled to keep the partitioned intake passage 12 open as shown in FIG. 4. That is, when the internal combustion engine performs full-load combustion, the engine load is very high and therefore the intake air amount must be increased as much as possible. When the engine operating condition is in the high speed range Z4, an inertia charging effect may be achieved and the intake air amount may be very large by the shape of the intake passage being as wide and short as possible because of the relation with the engine speed. Therefore, when the intake passage length-changing valve 11 and the tumble control valve 17 are controlled as described above, because the shape of the intake passage can be the widest and shortest, a very large amount of air flows into the combustion chamber 4 by an inertia charging effect.

When the main intake passage 5, the sub-intake passage 8, the intake passage length-changing valve 11, and the tumble control valve 17 are constituted and arranged as in this embodiment, a higher inertia charging effect may be achieved because the volume of the intake passage from the surge tank 1 to the combustion chamber 4 hardly changes.

A second embodiment of the intake control device for an internal combustion engine according to the present invention is described next. FIG. 7 to FIG. 10 illustrate the second embodiment. In this embodiment, the main intake passage 5 and the sub-intake passage 8 are the same as those in the first embodiment However, in this embodiment, the partition 14, the intake passage length-changing valve 11, and the tumble control valve 17 are different from those in the first embodiment.

The intake passage length-changing valve 11 in this embodiment, which is disposed upstream of the intake pipe connection point (the point where the sub-intake pipe 6 is connected to the main intake pipe 3) S in the main intake pipe 3 and rotatable about the pivot shaft 9 to open and close the main intake pipe 3, has two plate-shaped valve elements 10A and 10B which are rotatable independently through different ranges about the pivot shaft 9 as a common pivot shaft. The intake passage length-changing valve 11 shown in FIG. 7 and FIG. 8 has closed the main intake pipe 3 and the intake passage length-changing valve 11 shown in FIG. 9 and FIG. 10 has opened the main intake pipe 3.

A partition 14 for partitioning an internal space in the main intake passage 5 along the axis of the main intake passage 5 into two partitioned intake passages is disposed downstream of the intake pipe connection point S in the main intake passage 5. The partition 14 is a flat plate and disposed such that the width direction of a plane including the plate is perpendicular or generally perpendicular to the central axis of the combustion chamber 4. Also, the partition 14 extends toward the surge tank 1 such that a periphery of the valve element 10A of the intake passage length-changing valve 11 is adjacent to the surge tank 1 side end of the partition 14 when the intake passage length-changing valve 11 is in the state shown in FIG. 7.

The plate-shaped valve element 16 of the tumble control valve 17 is disposed such that it is rotatable about a pivot shaft 15 attached to an intermediate portion of the partition 14, in particular, a part of the partition 14 slightly on the surge tank 1 side from the center thereof, to open and close the partitioned intake passage 12. The tumble control valve 17 shown in FIG. 7 and FIG. 9 has closed the partitioned intake passage 12, and the tumble control valve 17 shown in FIG. 8 and FIG. 10 has opened the partitioned intake passage 12. When the tumble control valve 17 has opened the partitioned intake passage 12, the plate-shaped valve element 16 of the tumble control valve 17 is parallel to the partition 14, and, in particular, on the same or generally the same plane as the partition 14 as shown in FIG. 8 and FIG. 10.

The partitioned intake passage 12, which is opened and closed by the tumble control valve 17, is the partitioned intake passage on the side opposite the side on which the sub-intake pipe 6 is connected to the main intake pipe 3 with respect to the partition 14. When the intake passage length-changing valve 11 is in the state shown in FIG. 10, it is parallel to the partition 14 and, in particular, on the same plane or generally the same plane as the partition 14.

Figure 7:
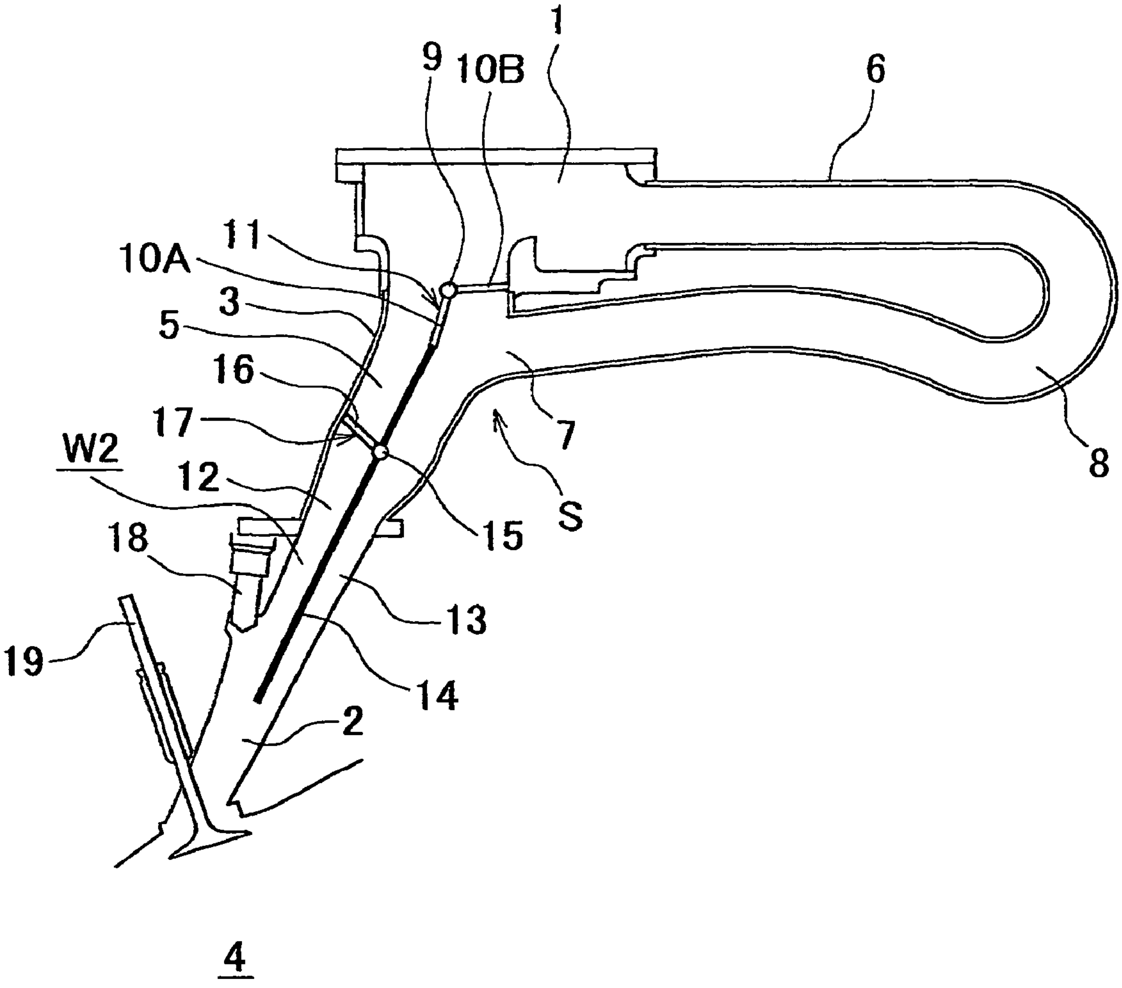
FIG. 7 is a view illustrating an intake control device for an internal combustion engine according to a second embodiment of the present invention, in which an intake passage length-changing valve has closed a main intake passage and a tumble control valve has closed one of partitioned intake passages.

When the intake passage length-changing valve 11 and the tumble control valve 17 are in the state shown in FIG. 7, air flows firm the surge tank 1 through the sub-intake passage 8 into the main intake passage 5, and flows into the combustion chamber 4 only through the partitioned intake passage 13, which is not closed by the tumble control valve 17. When the intake passage length hanging valve 11 and the tumble control valve 17 are in the state shown in FIG. 8, air flows from the surge tank 1 through the sub-intake passage 8 into the main intake passage 5, and flows into the combustion chamber 4 through both the partitioned intake passages 12 and 13. When the intake passage length-changing valve 11 and the tumble control valve 17 are in the state shown in FIG. 9, air mainly flows dizzy into the main intake passage 5, and flows into the combustion chamber 4 only through the partitioned intake passage 13, which is not closed by the tumble control valve 17. When the intake passage length-changing valve 11 and the tumble control valve 17 are in the state shown in FIG. 10, air mainly flows from the surge tank 1 directly into the main intake passage 5, and flows into the combustion chamber 4 through both the partitioned intake passages 12 and 13.

Figure 8:
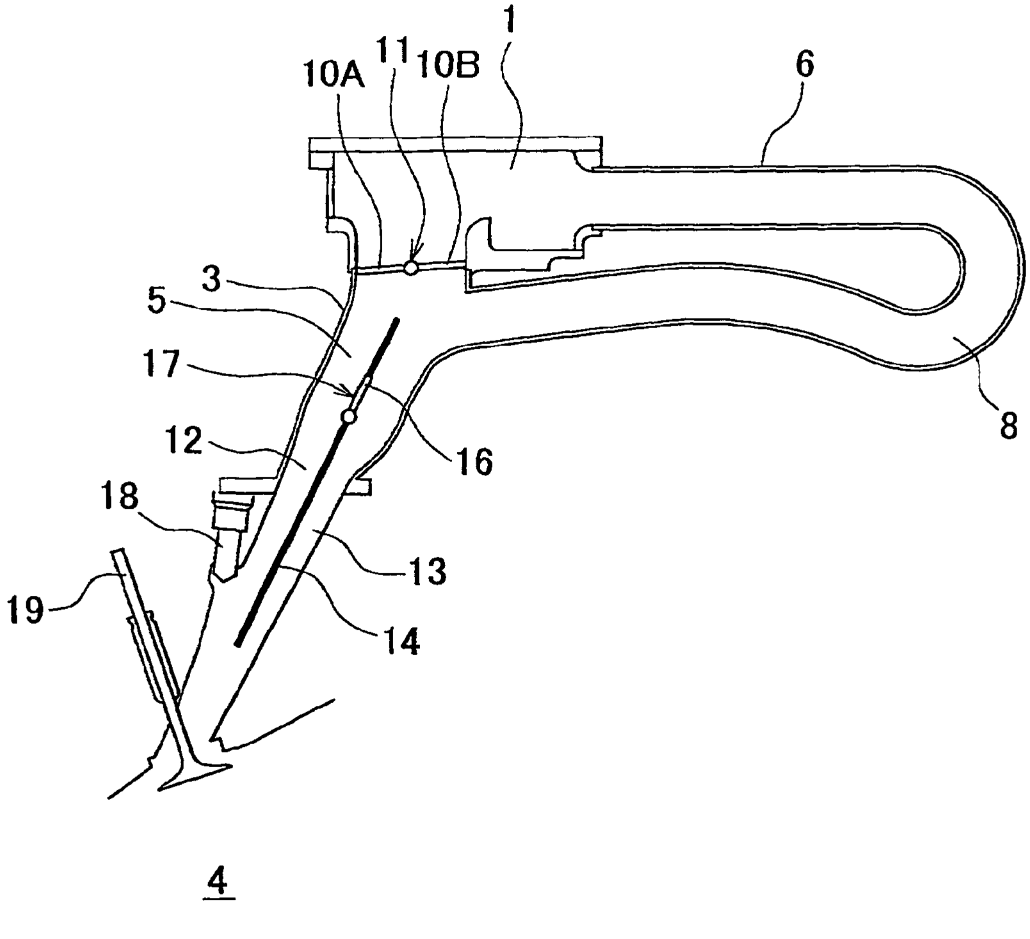
FIG. 8 is a view illustrating, as in the case with FIG. 7, the intake control device for an internal combustion engine according to the second embodiment of the present invention, in which the intake passage length-changing valve has closed the main intake passage and the tumble control valve has opened the partitioned intake passages.
Figure 9:
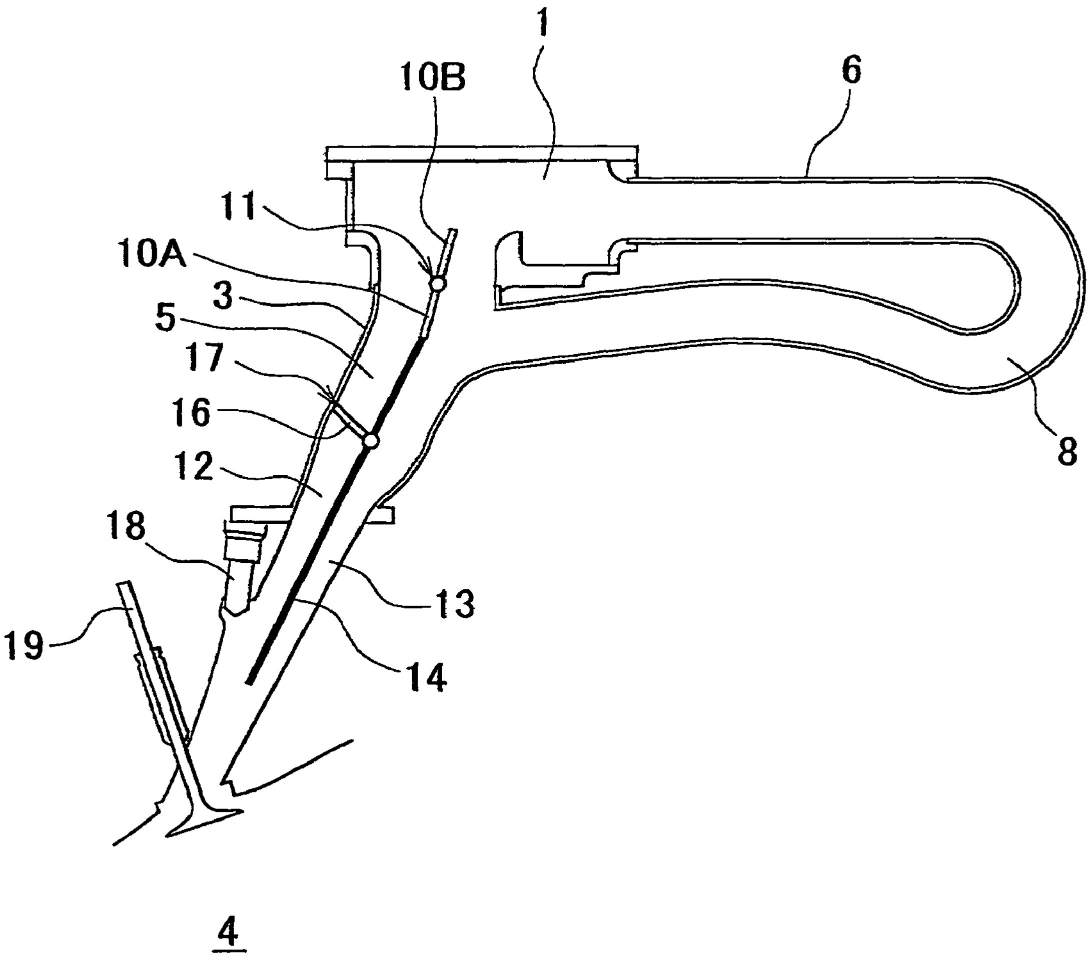
FIG. 9 is a view illustrating, as in the case with FIG. 7, the intake control device for an internal combustion engine according to the second embodiment of the present invention, in which the intake passage length-changing valve has opened the main intake passage and the tumble control valve has closed one of the partitioned intake passages.
Figure 10:
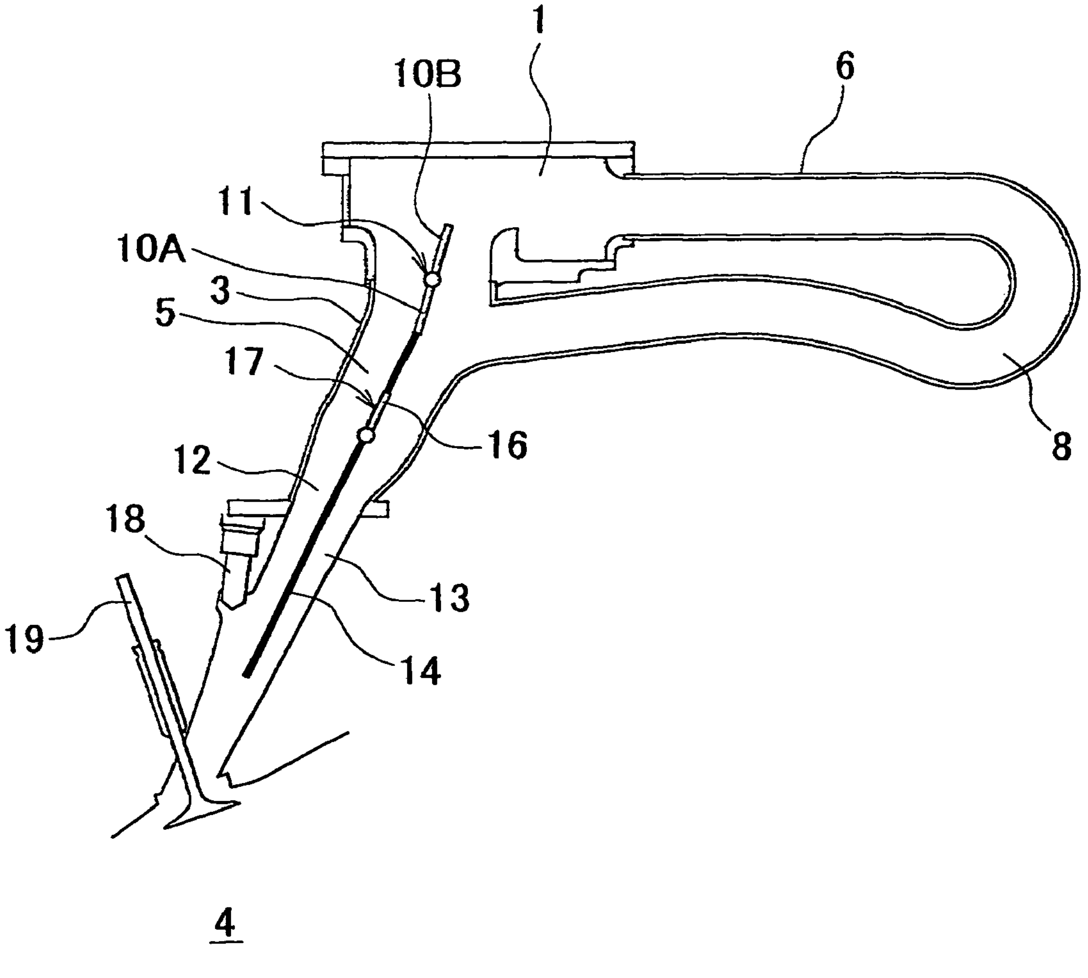
FIG. 10 is a view illustrating, as in the case with FIG. 7, the intake control device for an internal combustion engine according to the second embodiment of the present invention, in which the intake passage length-changing valve has opened the main intake passage and the tumble control valve has opened the partitioned intake passages.

The shape of the intake passage (the shape of the intake passage, through which air flows from the surge tank 1 into the combustion chamber 4) is the narrowest and longest when the intake passage length-changing valve 11 and the tumble control valve 17 are in the state shown in FIG. 7, second narrowest and longest when in the state shown in FIG. 8, third narrowest and longest when in the state shown in FIG. 9, and the widest and shortest when in the state shown in FIG. 10.

When the tumble control valve 17 has closed the partitioned intake passage 12 as shown in FIG. 7 and FIG. 9, air flows into the combustion chamber 4 through the partitioned intake passage 13, which is not closed by the tumble control valve 17, and, as described in association with the first embodiment, a tumble flow of air (air-fuel mixture) is formed in the combustion chamber 4.

The control of the intake passage length-changing valve 11 and the control of the tumble control valve 17 are next described. When the engine operating condition is in the range Y shown in FIG. 6 and the internal combustion engine is performing stoichiometric combustion, the intake passage length-changing valve 11 is controlled to keep the main intake passage 5 open and the tumble control valve 17 is controlled to keep the partitioned intake passage 12 open as shown in FIG. 10. When the internal combustion engine performs stoichiometric combustion, the intake air amount (the amount of air to be drawn into the combustion chamber 4) must be increased to a relatively large level. When the intake passage length-changing valve 11 and the tumble control valve 17 are controlled as described above, because air flows into the combustion chamber 4 through the entire main intake passage 5, pumping loss is reduced and the intake air amount can be relatively large.

When the engine operating condition is in the range X shown in FIG. 6 and the internal combustion engine is performing lean-burn combustion, the intake passage length-changing valve 11 is controlled to keep the main intake passage 5 open and the tumble control valve 17 is controlled to keep the partitioned intake passage 12 closed as shown in FIG. 9. That is, the internal combustion engine performs lean-burn combustion, the intake air amount does not have to be increased very much but good combustion must be achieved with a small amount of fuel. When the intake passage length-changing valve 11 and the tumble control valve 17 are controlled as described above, because air flows into the combustion chamber 4 only through the partitioned intake passage 12, a tumble flow of air (air-fuel mixture) is formed in the combustion chamber 4. Then, mixing of fuel and air is promoted, and good combustion is achieved with a small amount of fuel.

When the engine operating condition is in the low speed range Z1 shown in FIG. 6 and the internal combustion engine is performing full-load combustion, the intake passage length-changing valve 11 is controlled to keep the main intake passage 5 closed and the tumble control valve 17 is controlled to keep the partitioned intake passage 12 closed as shown FIG. 7. When the internal combustion engine performs full-load combustion, the intake air amount must be increased as much as possible. When the engine operating condition is in the low speed range Z1, an inertia charging effect may be achieved and the intake air amount may be vary large by the shape of the intake passage (the shape of the intake passage through which air flows from the surge tank 1 into the combustion chamber 4) being as narrow and long as possible because of the relation with the engine speed. Therefore, when the intake passage length-changing valve 11 and the tumble control valve 17 are controlled as described above, a very large amount of air flows into the combustion chamber 4 by an inertia charging effect because of the shape of the intake passage is at its narrowest and longest.

When the engine operating condition is in the low-intermediate speed range Z2 shown in FIG. 6 and the internal combustion engine is performing full-load combustion, the intake passage length-changing valve 11 is controlled to keep the main intake passage 5 closed and the tumble control valve 17 is controlled to keep the partitioned intake passage 12 open as shown in FIG. 8. When the internal combustion engine performs full-load combustion, the intake air amount must be increased as much as possible. When the engine operating condition is in the low-intermediate speed range Z2, an inertia charging effect may be achieved and the intake air amount may be very large by the shape of the intake passage being the second narrowest and longest because of the relation with the engine speed. Therefore, when the intake passage length-changing valve 11 and the tumble control valve 17 are controlled as described above, a very large amount of air flows into the combustion chamber 4 by an inertia charging effect because the shape of the intake passage is at its be the second narrowest and longest.

When the engine operating condition is in the intermediate-high speed range Z3 and the internal combustion engine is performing full-load combustion, the intake passage length-changing valve 11 is controlled to keep the main intake passage 5 open and the tumble control valve 17 is controlled to keep the partitioned intake passage 12 closed as shown in FIG. 9. When the internal combustion engine performs full-load combustion, the intake air amount must be increased as much as possible. When the engine operating condition is in the intermediate-high speed range Z3, an inertia charging effect may be achieved and the amount of air may be very large by the shape of the intake passage being the third narrowest and longest because of the relation with the engine speed. Therefore, when the intake passage length-changing valve 11 and the tumble control valve 17 are controlled as described above, a very large amount of air flows into the combustion chamber 4 by an inertia charging effect because the intake passage is at its third narrowest and longest.

When the engine operating condition is in the high speed range Z4 shown in FIG. 6 and the internal combustion engine is performing full-load combustion, the intake passage length-changing valve 11 is controlled to keep the main intake passage 5 open and the tumble control valve 17 is controlled to keep the partitioned intake passage 12 open as shown in FIG. 10. When the internal combustion engine performs full-load combustion, the intake air amount must be increased as much as possible. When the engine operating condition is in the high speed range Z4, an inertia charging effect may be achieved and the intake air amount may be very large by the shape of the intake passage being as wide and short as possible because of the relation with the engine speed. Therefore, when the intake passage length-changing valve 11 and the tumble control valve 17 are controlled as described above, a very large amount of air flows into the combustion chamber 4 by an inertia charging effect because the shape of the intake passage is at its widest and shortest.

When the main intake passage 5, the sub-intake passage 8, the intake passage length-changing valve 11, and the tumble control valve 17 are constituted and arranged as in this embodiment, a higher inertia charging effect may be achieved because the volume of the intake passage from the surge tank 1 to the combustion chamber 4 hardly changes. Especially, the region designated by a reference symbol W1 is a region where the volume of the intake passage is changed largely (so-called dead volume) when the intake passage length-changing valve 11 and the tumble control valve 17 are in the state shown in FIG. 1 in the first embodiment, but such a region where the volume of the intake passage is changed largely is not formed in the second embodiment as shown in FIG. 7. As a result, a higher inertia charging effect may be achieved.

A third embodiment of the intake control device for an internal combustion engine according to the present invention is next described FIG. 11 to FIG. 14 illustrate the third embodiment. In this embodiment, the main intake passage 5 the sub-intake passage 8, the intake passage length-changing valve 11, and the partition 14 are the same as those in the second embodiment. However, in this embodiment, the tumble control valve 17 is different from those in the second embodiment.

The plate-shaped valve element 16 of the tumble control valve 17 is disposed such that it is rotatable about a pivot shaft 15 attached to a part of the partition 14 adjacent to the combustion chamber side end thereof to open and close the partitioned intake passage 12. The tumble control valve 17 shown in FIG. 11 and FIG. 13 has closed the partitioned intake passage 12, and the tumble control valve 17 shown in FIG. 12 and FIG. 14 has opened the partitioned intake passage 12. When the tumble control valve 17 has opened the partitioned intake passage 12, the plate-shaped valve element 16 of the tumble control valve 17 is parallel to the partition 14, and, in particular, on the same or generally the same plane as the partition 14 as shown in FIG. 12 and FIG. 14.

Figure 11:
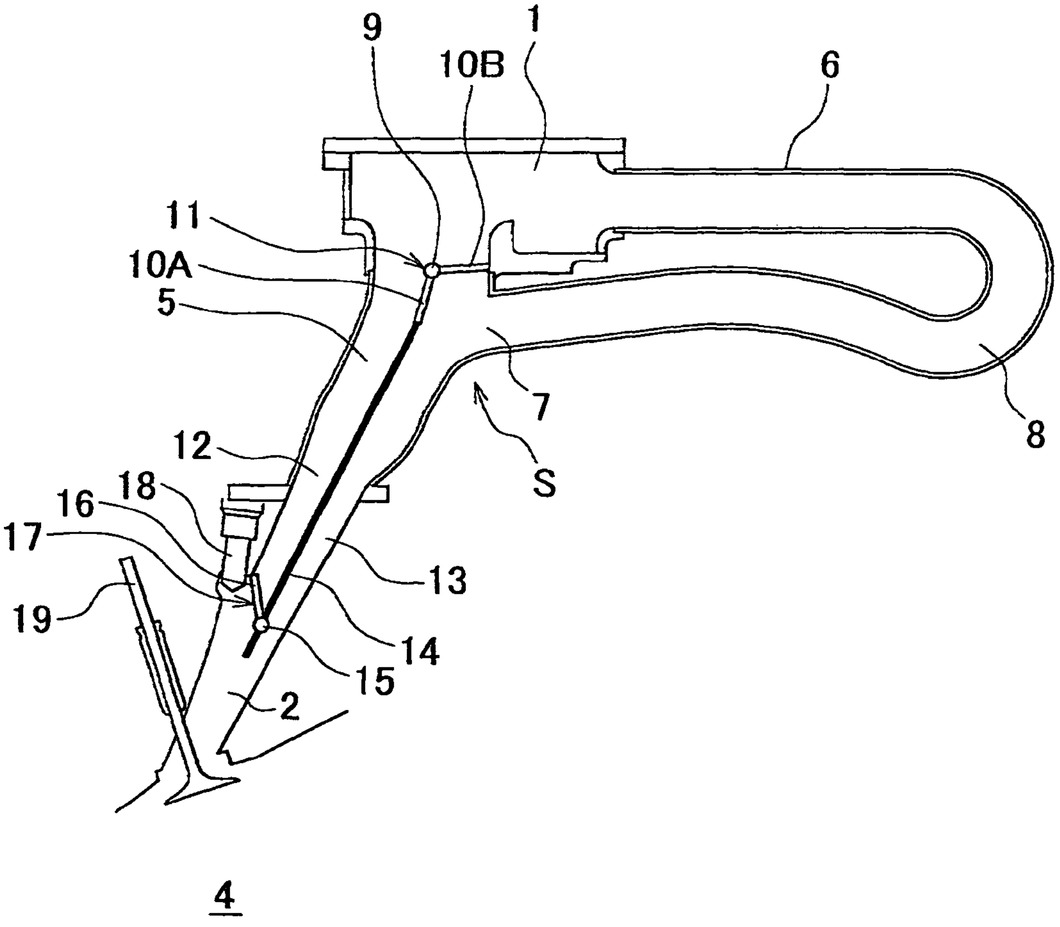
FIG. 11 is a view illustrating an intake control device for an internal combustion engine according to a third embodiment of the present invention, in which an intake passage length-changing valve has closed a main intake passage and a tumble control valve has closed one of partitioned intake passages.
Figure 13:
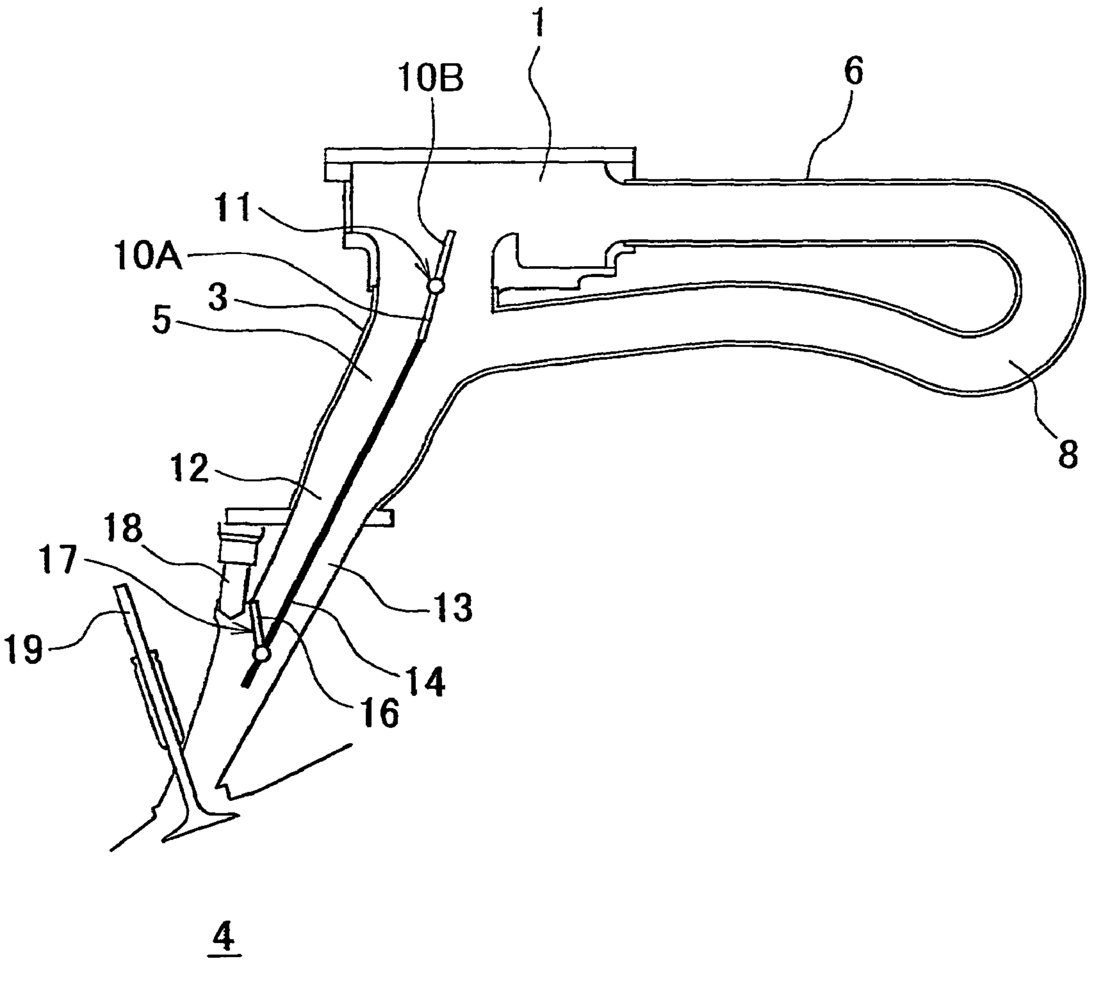
FIG. 13 is a view illustrating, as in the case with FIG. 11, the intake control device for an internal combustion engine according to the third embodiment of the present invention, in which the intake passage length-changing valve has opened the main intake passage and the tumble control valve has closed one of the partitioned intake passages.
Figure 14:
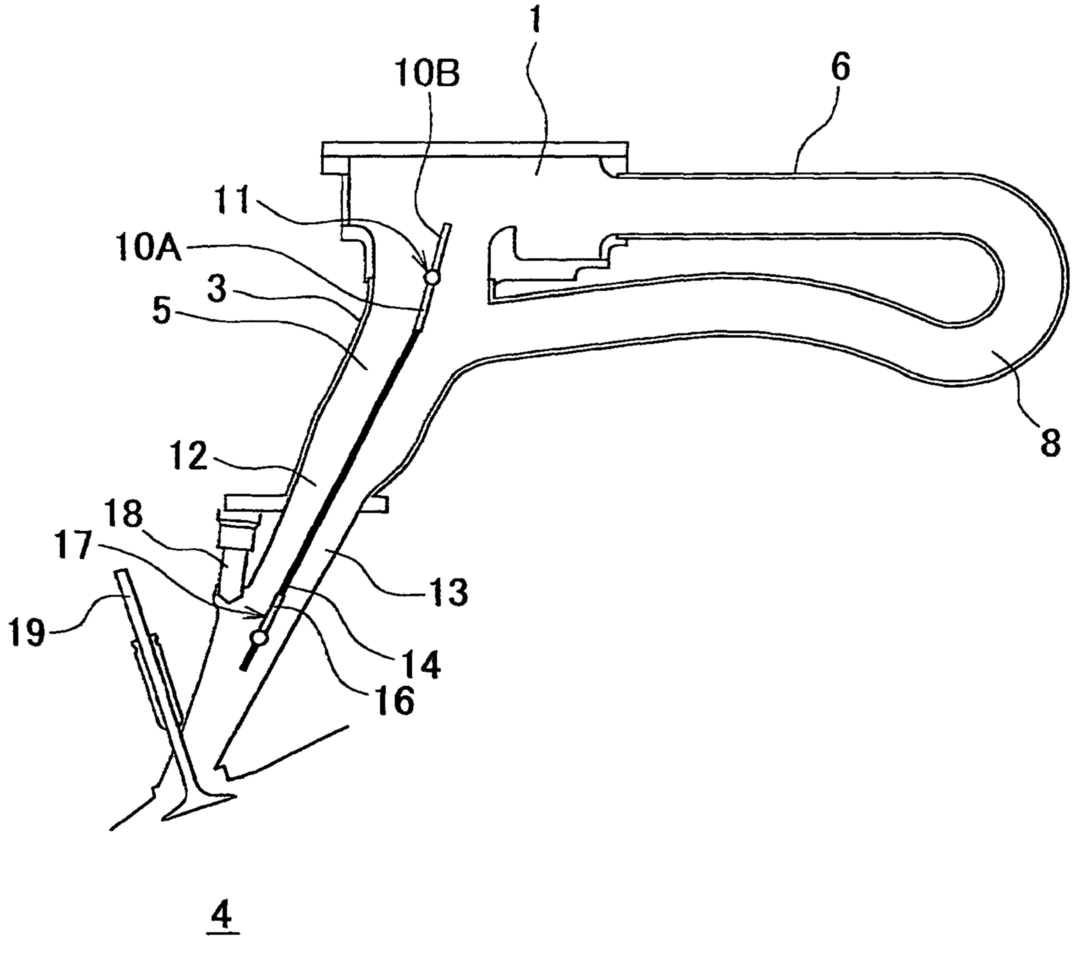
FIG. 14 is a view illustrating, as in the case with FIG. 11, the intake control device for an internal combustion engine according to the third embodiment of the present invention, in which the intake passage length-changing valve has opened the main intake passage and the tumble control valve has opened the partitioned intake passages.

The intake passage length-changing valve 11 shown in FIG. 11 and FIG. 12 has closed the main intake pipe 3 and the intake passage length-changing valve 11 shown in FIG. 13 and FIG. 14 has opened the main intake pipe 3. The partitioned intake passage 12, which is opened and closed by the tumble control valve 17, is on the side opposite the side on which the sub-intake pipe 6 is connected to the main intake pipe 3 with respect to the partition 14.

When the intake passage length-changing valve 11 and the tumble control valve 17 am in the state shown in FIG. 11, air flows from the surge tank 1 trough the sub-intake passage 8 into the main intake passage 5, and flows into the combustion chamber 4 only through the partitioned intake passage 13, which is not closed by the tumble control valve 17. When the intake passage length-changing valve 11 and the tumble control valve 17 are in the state shown in FIG. 12, air flows from the surge tank 1 through the sub-intake passage 8 into the main intake passage 5, and flows into the combustion chamber 4 through both the partitioned intake passages 12 and 13.

When the intake passage length-changing valve 11 and the tumble control valve 17 are in the state shown in FIG. 13, air mainly flows directly into the main intake passage 5, and flows into the combustion chamber 4 only through the partitioned intake passage 13, which is not closed by the tumble control valve 17. When the intake passage length-changing valve 11 and the tumble control valve 17 are in the state shown in FIG. 14, air mainly flows from the surge tank 1 directly into the main intake passage 5, and flows into the combustion chamber 4 through both the partitioned intake passages 12 and 13.

The shape of the intake passage (the shape of the intake passage, through which air flows from the surge tank 1 into the combustion chamber 4) is the narrowest and longest when the intake passage length-changing valve 11 and the tumble control valve 17 are in the state shown in FIG. 11, second narrowest and longest when in the state shown in FIG. 12, third narrowest and longest when in the state shown in FIG. 13, and the widest and shortest when in the state shown in FIG. 14.

When the tumble control valve 17 has closed the partitioned intake passage 12 as shown in FIG. 11 and FIG. 13, air flows into the combustion chamber 4 through the partitioned intake passage 13, which is not closed by the tumble control valve 17, and, as described in association with the first embodiment, a tumble flow of air (air-fuel mixture) is formed in the combustion chamber 4.

The control of the intake passage length-changing valve 11 and the control of the tumble control valve 17 are next described. When the engine operating condition is in the range Y shown in FIG. 6 and the internal combustion engine is performing stoichiometric combustion, the intake passage length-changing valve 11 is controlled to keep the main intake passage 5 open and the tumble control valve 17 is controlled to keep the partitioned intake passage 12 open as shown in FIG. 14. When the internal combustion engine performs stoichiometric combustion, the intake air amount (the amount of air to be drawn into the combustion chamber 4) must be increased to a relatively large level. When the intake passage length-changing valve 11 and the tumble control valve 17 are controlled as described above, pumping loss is reduced and the intake air amount can be relatively large because air flows into the combustion chamber 4 through the entire main intake passage 5.

When the engine operating condition is in the range X shown in FIG. 6 and the internal combustion engine is performing lean-burn combustion, the intake passage length-changing valve 11 is controlled to keep the main intake passage 5 open and the tumble control valve 17 is controlled to keep the partitioned intake passage 12 closed as shown in FIG. 13. That is, the internal combustion engine performs lean-burn combustion, the intake air amount does not have to be increased very much but good combustion must be achieved with a small amount of fuel. When the intake passage length-changing valve 11 and the tumble control valve 17 are controlled as described above, a tumble flow of air (air-fuel mixture) is formed in the combustion chamber 4 because air flows into the combustion chamber 4 only through the partitioned intake passage 12. Then, mixing of fuel and air is promoted, and good combustion is achieved with a small amount of fuel.

When the engine operating condition is in the low speed range Z1 shown in FIG. 6 and the internal combustion engine is performing fuel-load combustion, the intake passage length-changing valve 11 is controlled to keep the main intake passage 5 closed and the tumble control valve 17 is controlled to keep the partitioned intake passage 12 closed as shown FIG. 11. When the internal combustion engine performs full-load combustion, the intake air amount must be increased as much as possible. When the engine operating condition is in the low speed range Z1, an inertia charging effect may be achieved and the intake air amount may be vary large by the shape of the intake passage (the shape of the intake passage through which air flows from the surge tank 1 into the combustion chamber 4) being as narrow and long as possible. Therefore, when the intake passage length-changing valve 11 and the tumble control valve 17 are controlled as described above, because the shape of the intake passage is at its narrowest and longest, a very large amount of air flows into the combustion chamber 4 by an inertia charging effect.

When the engine operating condition is in the low-intermediate speed range Z2 shown in FIG. 6 and the internal combustion engine is performing full-load combustion, the intake passage length-changing valve 11 is controlled to keep the main intake passage 5 closed and the tumble control valve 17 is controlled to keep the partitioned intake passage 12 open as shown in FIG. 12. When the internal combustion engine performs full-load combustion, the intake air amount must be increased as much as possible. When the engine operating condition is in the low-intermediate speed range Z2, an inertia charging effect may be achieved and the intake air amount may be very large by the shape of the intake passage being the second narrowest and longest because of the relation with the engine speed. Therefore, when the intake passage length-changing valve 11 and the tumble control valve 17 are controlled as described above, a very large amount of air flows into the combustion chamber 4 by an inertia charging effect because the shape of the intake passage is at its second narrowest and longest.

When the engine operating condition is in the intermediate-high speed range Z3 and the internal combustion engine is performing full-load combustion, the intake passage length-changing valve 11 is controlled to keep the main intake passage 5 open and the tumble control valve 17 is controlled to keep the partitioned intake passage 12 closed as shown in FIG. 13. When the internal combustion engine performs full-load combustion, the intake air amount must be increased as much as possible. When the engine operating condition is in the intermediate-high speed range Z3, an inertia charging effect may be achieved and the amount of air may be very large by the shape of the intake passage being the third narrowest and longest because of the relation with the engine speed. Therefore, when the intake passage length-changing valve 11 and the tumble control valve 17 are controlled as described above, because the shape of the intake passage is at its third narrowest and longest, a very large amount of air flows into the combustion chamber 4 by an inertia charging effect.

When the engine operating condition is in the high speed range Z4 shown in FIG. 6 and the internal combustion engine is performing full-load combustion, the intake passage length-changing valve 11 is controlled to keep the main intake passage 5 open and the tumble control valve 17 is controlled to keep the partitioned intake passage 12 open as shown in FIG. 14. When the internal combustion engine performs full-load combustion, the intake air amount must be increased as much as possible. When the engine operating condition is in the high speed range Z4, an inertia charging effect may be achieved and the intake air amount may be very large by the shape of the intake passage being as wide and short as possible because of the relation with the engine speed. Therefore, when the intake passage length-changing valve 11 and the tumble control valve 17 are controlled as described above, a very large amount of air flows into the combustion chamber 4 due to the inertia charging effect because the shape of the intake passage is at its widest and shortest.

When the main intake passage 5, the sub-intake passage 8, the intake passage length-changing valve 11, and the tumble control valve 17 are constituted and arranged as in this embodiment, a higher inertia charging effect may be achieved because the volume of the intake passage from the surge tank 1 to the combustion chamber 4 hardly changes. Especially, because the region W1, which is formed when the intake passage length-changing valve 11 and the tumble control valve 17 are in the state shown in FIG. 1 in the first embodiment and in which the volume of the intake passage is changed largely, is not formed in the third embodiment as shown in FIG. 11, a higher inertia charging effect can be achieved.

Also, according to this embodiment, when the partitioned intake passage 12 is dosed by the tumble control valve 17, a stronger tumble flow of air (air-fuel mixture) is formed in the combustion chamber 4. For example, if the tumble control valve 17 is attached to an intermediate part of the partition 14 as in the second embodiment shown in FIG. 7 to FIG. 10, a space W2 downstream of the tumble control valve 17 in the partitioned intake passage 12 is relatively large when the partitioned intake passage 12 is closed by the tumble control valve 17, as can be understood with reference to FIG. 7, and air accumulates in the partitioned intake passage 12 downstream of the tumble control valve 17 while the intake valve 19 is closed In this case, when the intake valve 19 is opened and air is drawn into the combustion chamber 4, the air accumulated in the space W2 downstream of the tumble control valve 17 in the partitioned intake passage 12 is also drawn into the combustion chamber 4. Thus, the tumble flow of air (air-fuel mixture) formed in the combustion chamber 4 may be weakened. However, if the tumble control valve 17 is attached to a part of the partition 14 adjacent to the combustion chamber 4 side end thereof as in the third embodiment, the space downstream of the tumble control valve 17 in the partitioned intake passage 12 is relatively small when the partitioned intake passage 12 is closed by the tumble control valve 17 as can be understood with reference to FIG. 11 and only a small amount of air is accumulated in the partitioned intake passage 12 downstream of the tumble control valve 17 while the intake valve 19 is closed. Thus, the amount of air which drawn into the combustion chamber 4 from the space downstream of the tumble control valve 17 in the partitioned intake passage 12 when the intake valve 19 is opened is very small and a much larger amount of air is drawn into the combustion chamber 4 through the partitioned intake passage 13, which is not closed by the tumble control valve 17. Therefore, a stronger tumble flow of air (air-fuel mixture) is formed in the combustion chamber 4.

Also, in the first embodiment, when the intake passage length-changing valve 11 and the tumble control valve 17 are switched from the state shown in FIG. 2 to the state shown in FIG. 3, the intake passage length hanging valve 11 and the tumble control valve 17 may be simultaneously switched from the state shown in FIG. 2 to the state shown in FIG. 3. However, to minimize fluctuations in at least in the torque output from the internal combustion engine that may occur when the intake passage length-changing valve 11 and the tumble control valve 17 are switched, the tumble control valve 17 may be switched from the state shown in FIG. 2 to the state shown in FIG. 3 after the intake passage length-changing valve 11 is switched from the state shown in FIG. 2 to the state shown in FIG. 3. That is, the intake passage length-changing valve 11 and the tumble control valve 17 may be switched from the state shown in FIG. 2 through the state shown in FIG. 4 to the state shown in FIG. 3.

For the same reason, in the second embodiment, when the intake passage length-changing valve 11 and the tumble control valve 17 are switched from the state shown in FIG. 8 to the state shown in FIG. 9, the intake passage length-changing valve 11 and the tumble control valve 17 may be switched from the state shown in FIG. 8 through the state shown in FIG. 10 to the state shown in FIG. 9. For the same reason, in the third embodiment, when the intake passage length-changing valve 11 and the tumble control valve 17 are switched from the state shown in FIG. 12 to the state shown in FIG. 13, the intake passage length-changing valve 11 and the tumble control valve 17 may be switched from the state shown in FIG. 12 through the state shown in FIG. 14 to the state shown in FIG. 13.

In addition, in the first embodiment, when the intake passage length-changing valve 11 and the tumble control valve 17 are switched from the state shown in FIG. 3 to the state shown in FIG. 2, the intake passage length-changing valve 11 and the tumble control valve 17 may be simultaneously switched from the state shown in FIG. 3 to the state shown in FIG. 3. However, to minimize fluctuations in at least in the torque output from the internal combustion engine that may occur when the intake passage length-changing valve 11 and the tumble control valve 17 are switched, the intake passage length-changing valve 11 may be switched from the state shown in FIG. 3 to the state shown in FIG. 2 after the tumble control valve 17 is switched from the state shown in FIG. 3 to the state shown in FIG. 2. That is, the intake passage length-changing valve 11 and the tumble control valve 17 may be switched from the state shown in FIG. 3 through the state shown in FIG. 4 to the state shown in FIG. 2.

For the same reason, in the second embodiment, when the intake passage length-changing valve 11 and the tumble control valve 17 are switched from the state shown in FIG. 9 to the state shown in FIG. 8, the intake passage length-changing valve 11 and the tumble control valve 17 may be switched from the state shown in FIG. 9 through the state shown in FIG. 10 to the state shown in FIG. 8. For the same reason, in the third embodiment, when the intake passage length-changing valve 11 and the tumble control valve 17 are switched from the state shown in FIG. 13 to the state shown in FIG. 12, the intake passage length-changing valve 11 and the tumble control valve 17 may be switched from the state shown in FIG. 13 through the state shown in FIG. 14 to the state shown in FIG. 12.

According to the embodiments of the present invention, a high inertia charging effect can be achieved regardless of the operating condition of the tumble control valve.

The invention claimed is:

1. An internal combustion engine intake control device comprising:

- a surge tank;
- a first intake passage that extends from the surge tank and is connected to a combustion chamber;
- a second intake passage that extends from the surge tank and merges with the first intake passage between the surge tank and the combustion chamber;
- an intake passage length-changing valve, provided within the first intake passage and upstream of a connection point where the second intake passage connects to the first intake passage, that opens and closes the first intake passage;
- a partition, disposed in the first intake passage, that partitions an internal space in the first intake passage downstream of the connection point along an axis of the first intake passage to form two partitioned intake passages; and
- a tumble control valve that:
  - opens and closes one of the partitioned intake passages, wherein when the tumble control valve closes one of the partitioned intake passages air drawn into the combustion chamber through the open partitioned intake passage forms a tumble flow,
  - is attached to the partition,
  - is rotatable about a pivot shaft that is attached to the partition, the pivot shaft being attached to the partition proximate to a downstream end of the partition that is near the combustion chamber, and
  - has a plate-shaped valve element that:
    - is rotatable about the pivot shaft,
    - is parallel to the partition when the tumble control valve has opened the one of the partitioned intake passages, and
    - is in or near the same plane as the partition when the tunable control valve has opened the partitioned intake passage, wherein:
  - the length of the second intake passage from the surge tank to the first intake passage is longer than the length of the first intake passage from the surge tank to the connection point and the cross-sectional area of the second intake passage is smaller than the cross-sectional area of the first intake passage from the surge tank to the connection point,
  - the second intake passage is connected to the first intake passage from a direction generally perpendicular to the partition, and
  - the tumble control valve opens and closes the partitioned intake passage formed on the side opposite the side on which the second intake passage is connected to the first intake passage with respect to the partition.

2. The internal combustion engine intake control device according to claim 1, wherein the connection point is closer to the surge tank than to the combustion chamber.

3. The internal combustion engine intake control device according to claim 2, wherein the connection point is adjacent to the surge tank.

4. The internal combustion engine intake control device according to claim 1, wherein the intake passage length-changing valve has a plate-shaped valve element, and the plate-shaped valve element of the intake passage length-changing valve is in or near the same plane as the partition when the intake passage length-changing valve has opened the first intake passage.

5. The internal combustion engine intake control device according to claim 4, wherein a periphery on the combustion side of the plate-shaped valve element of the intake passage length-changing valve is adjacent to the surge tank side end of the partition when the intake passage length-changing valve has opened the first intake passage.

6. The internal combustion engine intake control device according to claim 5, wherein the intake passage length-changing valve has two plate-shaped valve elements independently rotatable through different ranges about two adjacent pivot shafts or one common pivot shaft, and a periphery of one of the plate-shaped valve elements of the intake passage length-changing valve is adjacent to the surge tank side end of the partition and a periphery of the other plate-shaped valve element of the intake passage length-changing valve is adjacent to an end face on the surge tank side of the second intake passage connected to the first intake passage when the intake passage length-changing valve has closed the first intake passage.

7. The internal combustion engine intake control device according to claim 1, wherein the length and passage cross-sectional area of the first intake passage and the length and passage cross-sectional area of the second intake passage are set such that air is drawn into the combustion chamber through the first intake passage with the aid of an inertia charging effect when the engine speed is higher than a predetermined engine speed and that air is drawn into the combustion chamber through the second intake passage with the aid of an inertia charging effect when the engine speed is lower than a predetermined engine speed.

8. The internal combustion engine intake control device according to claim 1, wherein the intake passage length-changing valve keeps the first intake passage open and the tumble control valve keeps the partitioned intake passage open when the engine load is lower than a predetermined engine load in an engine load range that the internal combustion engine is operating at lower load than full load or close to full load and the internal combustion engine is performing stoichiometric combustion in which the air fuel mixture in the combustion chamber is burned at an air-fuel ratio equal to or close to stoichiometric air-fuel ratio, the intake passage length-changing valve keeps the first intake passage open and the tumble control valve keeps one of the partitioned intake passages closed when the engine load is higher than a predetermined engine load in an engine load range that the internal combustion engine is operating at lower load than full load or close to full load and the internal combustion engine is performing lean-burn combustion in which the air fuel mixture in the combustion chamber is burned at an air-fuel ratio greater than the stoichioinetric air-fuel ratio, the operation of the intake passage length-changing valve and the operation of the tumble control valve are controlled depending on the engine speed when the engine load is equal to or close to full load.

9. The internal combustion engine intake control device according to claim 1, wherein, in the case where the operating condition of the internal combustion engine is divided into a low speed operating condition, a low-intermediate speed operating condition, an intermediate-high speed operating condition, and a high speed operating condition in order of increasing engine speed, the intake passage length-changing valve keeps the first intake passage closed and the tumble control valve keeps one of the partitioned intake passages closed when the engine load is equal to or close to full load and the internal combustion engine is in the low speed operating condition, the intake passage length-changing valve keeps the first intake passage closed and the tumble control valve keeps the partitioned intake passage open when the engine load is equal to or close to full load and the internal combustion engine is in the a low-intermediate speed operating condition, the intake passage length-changing valve keeps the first intake passage open and the tumble control valve keeps one of the partitioned intake passages closed when the engine load is equal to or close to full load and the internal combustion engine is in the intermediate-high speed operating condition, and the intake passage length-changing valve keeps the first intake passage open and the tumble control valve keeps the partitioned intake passage open when the engine load is equal to or close to full load and the internal combustion engine is in the high speed operating condition.

* * * * *